(12) United States Patent
Park et al.

(10) Patent No.: US 11,905,624 B2
(45) Date of Patent: Feb. 20, 2024

(54) POROUS MULTI-METAL OXIDE NANOTUBES AND PRODUCTION METHOD THEREFOR

(71) Applicants: Hyundai Motor Company, Seoul (KR); Kia Corporation, Seoul (KR); Daegu Gyeongbuk Institute of Science and Technology, Daegu (KR)

(72) Inventors: Ju Ahn Park, Gyeonggi-do (KR); Sangaraju Shanmugam, Daegu (KR)

(73) Assignees: Hyundai Motor Company, Seoul (KR); Kia Corporation, Seoul (KR); Daegu Gyeongbuk Institute of Science and Technology, Daegu (KR)

( * ) Notice: Subject to any disclaimer, the term of this patent is extended or adjusted under 35 U.S.C. 154(b) by 80 days.

(21) Appl. No.: 17/341,955

(22) Filed: Jun. 8, 2021

(65) Prior Publication Data
US 2022/0195630 A1  Jun. 23, 2022

(30) Foreign Application Priority Data
Dec. 21, 2020  (KR) .................. 10-2020-0179801

(51) Int. Cl.
*D01F 9/10* (2006.01)
*H01M 8/10* (2016.01)
*D01D 5/00* (2006.01)

(52) U.S. Cl.
CPC .............. *D01F 9/10* (2013.01); *D01D 5/003* (2013.01); *D01D 5/0061* (2013.01); *H01M 8/10* (2013.01); *H01M 2008/1095* (2013.01)

(58) Field of Classification Search
CPC ........ D01F 9/10; D01D 5/003; D01D 5/0061; H01M 8/10
See application file for complete search history.

(56) References Cited

FOREIGN PATENT DOCUMENTS

| | | |
|---|---|---|
| JP | 4724860 B2 | 7/2011 |
| KR | 101449643 B1 | 10/2014 |
| KR | 101481115 B1 | 1/2015 |

*Primary Examiner* — James A Fiorito
(74) *Attorney, Agent, or Firm* — Fox Rothschild LLP

(57) ABSTRACT

Disclosed are porous multi-metal oxide nanotubes and a production method therefor. In one aspect, methods for producing porous multi-metal oxide nanotubes are provided comprising: (a) preparing an admixture comprising metal-acetylacetonate precursors, polyacrylonitrile (PAN) and a solvent component; and (b) producing a nanocomposite from the admixture, wherein metals of the metal-acetylacetonate precursors comprise a non-radioactive alkali metal stable isotope and a non-radioactive alkaline earth metal stable isotope. As such, porous multi-metal oxide nanotubes having a single-phase multivalence may be obtained in high yield without using harmful chemical substances. In addition, the polymer electrolyte membrane including the porous multi-metal oxide nanotubes may have maintained and improved mechanical strength, and thus may have maintained durability even during cell operation and may also have improved proton conductivity even at low humidity. The fuel cell including the polymer electrolyte membrane may have improved performance.

8 Claims, 11 Drawing Sheets

POROUS MULTI-METAL OXIDE NANOTUBES AND PRODUCTION METHOD THEREFOR

CROSS-REFERENCE TO RELATED APPLICATION

This application claims under 35 U.S.C. § 119(a) the benefit of priority to Korean Patent Application No. 10-2020-0179801 filed on Dec. 21, 2020, the entire contents of which are incorporated herein by reference.

TECHNICAL FIELD

The present invention relates to porous multi-metal oxide nanotubes and a production method therefor.

BACKGROUND

A proton exchange membrane fuel cell (PEMFC) is attracting attention as an alternative energy source for fossil fuels, because it has a high energy conversion efficiency of 60% or more, zero emission, and high current density, is light in weight and can operate at low operating temperatures.

Meanwhile, in the proton exchange membrane fuel cell (PEMFC), Pt/C is mainly used as a catalyst for oxygen reduction reaction (ORR) at the positive electrode, and at the same time, a hydrogen oxidation reaction (HOR) occurs at the negative electrode. In particular, since the ORR at the positive electrode is slower than the HOR at the negative electrode, the rate of the ORR determines the performance of the overall fuel cell system. At this time, if the proton exchange membrane fuel cell (PEMFC) is operated even under low relative humidity conditions, water flooding can be advantageously alleviated. However, the proton conductivity of Nafion ionomers varies widely at low humidity.

In order to solve this problem, research was conducted to increase the water content by incorporating nanometer-sized hygroscopic metal oxide particles. In this case, however, problems arise in that an antioxidant itself can aggregate and precipitate during cell operation, resulting in a significant decrease in cell stability, and the proton conductivity is still low at low humidity.

Meanwhile, when the fuel cell operates in an acidic environment with a pH of 2 or less, hydrogen peroxide ($H_2O_2$) is generated during a catalytic reaction to form free radicals. Thus, the formed radicals may attack the electrolyte membrane structure and degrade the performance of the fuel cell. In order to remove the formed free radicals, research was conducted to introduce an organic/metal compound-based or inorganic substance-based antioxidant into the electrolyte membrane of a fuel cell. In this case, however, there is a disadvantage in that the antioxidant may leak from the membrane electrode assembly (MEA) during long-term fuel cell operation and may also degrade the proton conductivity.

Accordingly, there is a need to develop technology capable of improving the performance of the proton exchange membrane fuel cell (PEMFC) by improving the proton conductivity that is reduced by free radicals generated during operation of the PEMFC and by low humidity.

SUMMARY OF THE INVENTION

In preferred aspects, provided are a method of producing porous multi-metal oxide nanotubes from at least two metal-acetylacetonate precursors, porous multi-metal oxide nanotubes which are produced by the method described herein and include a multi-metal oxide having a single-phase multivalence, and a polymer electrolyte membrane and an electrode, which each include the porous multi-metal oxide nanotubes, and a fuel cell including the same.

Objects of the present invention are not limited to the above-mentioned objects. Objects of the present invention will become more apparent from the following description, and will be realized by means described in the appended claims and combinations thereof.

In one aspect, methods for producing porous multi-metal oxide nanotubes are provided comprising: (a) preparing an admixture comprising metal-acetylacetonate precursors, polyacrylonitrile (PAN) and a solvent component; and (b) producing a nanocomposite from the admixture, wherein metals of the metal-acetylacetonate precursors comprise a non-radioactive alkali metal stable isotope and a non-radioactive alkaline earth metal stable isotope. Suitably, producing the nanocomposite may comprise electrospinning the admixture. In certain preferred aspects, the method may further comprise calcining the nanocomposite.

In an aspect, provided is a method of producing porous multi-metal oxide nanotubes. The method may include: preparing a spinning solution including metal-acetylacetonate precursors, polyacrylonitrile (PAN) and a solvent component; producing a nanocomposite by electrospinning the spinning solution; and calcining the nanocomposite. Preferably, metals contained in the metal-acetylacetonate precursors include a non-radioactive alkali metal stable isotope and a non-radioactive alkaline earth metal stable isotope.

The non-radioactive alkali metal stable isotope may include one or more selected from the group consisting of titanium (Ti), cerium (Ce), strontium (Sr), lanthanum (La), gadolinium (Gd), erbium (Er), scandium (Sc), palladium (Pd), osmium (Os), dysprosium (Dy), ytterbium (Yb), indium (In), and neodymium (Nd), and the non-radioactive alkaline earth metal stable isotope may include at least one selected from the group consisting of zirconium (Zr), niobium (Nb), yttrium (Y), tantalum (Ta), vanadium (V), molybdenum (Mo), silicon (Si), ruthenium (Ru), tin (Sn), tungsten (W), uranium (U), seaborgium (Sg), and tellurium (Te).

The metal-acetylacetonate precursors may include two or more precursors selected from the group consisting of titanium (Ti) (IV) oxyacetylacetonate, zirconium (Zr) (IV) acetylacetonate, cerium (Ce) (III) acetylacetonate, neodymium (Nd) (IV) acetylacetonate, gadolinium (Gd) (III) acetylacetonate, vanadyl acetylacetonate ($VO(C_5H_7O_2)_2$), tantalum (Ta) (V) acetylacetonate, niobium (Nb) (V) acetylacetonate, strontium (Sr) acetylacetonate, palladium (Pd) (II) acetylacetonate, and yttrium (Y) (III) acetylacetonate precursors.

The content of the metal-acetylacetonate precursors may be about 10 to 50 parts by weight based on 100 parts by weight of polyacrylonitrile (PAN).

The electrospinning may be performed by an electrospinning apparatus, the distance between a spinneret and a collector in the electrospinning apparatus may be about 8 to 12 cm, the high-voltage power in the electrospinning may be about 15 to 22 kV, the volume flow rate during the electrospinning may be about 0.8 to 1 $mL \cdot h^{-1}$, the rotational speed of the spinning solution may be about 300 to 1,000 rpm, and the electrospinning may be performed under an ambient air atmosphere.

The calcining step may be performed by calcining the nanocomposite at a temperature of higher than about 400° C. to not higher than about 600° C. for about 1 to 5 hours.

The heating rate during calcination in the calcining step may be about 4 to 6° C/min.

The calcining step may include stabilizing the nanocomposite at a temperature of about 230° C. to 250° C. for about 0.5 to 1.5 hours, before calcining the nanocomposite.

Further provided, in an aspect, is porous multi-metal oxide nanotubes may include a multi-metal oxide which is represented by the following Formula and has a single-phase multivalence.

$$A_2B_2O_8 \qquad \text{[Formula]}$$

wherein A is a non-radioactive alkali metal stable isotope ion, and B is a non-radioactive alkaline earth metal stable isotope ion.

The non-radioactive alkali metal stable isotope ion may include an ion of one or more metals selected from the group consisting of titanium (Ti), cerium (Ce), strontium (Sr), lanthanum (La), gadolinium (Gd), erbium (Er), scandium (Sc), palladium (Pd), osmium (Os), dysprosium (Dy), ytterbium (Yb), indium (In), and neodymium (Nd), and the non-radioactive alkaline earth metal stable isotope ion may include an ion of at least one selected from the group consisting of zirconium (Zr), niobium (Nb), yttrium (Y), tantalum (Ta), vanadium (V), molybdenum (Mo), silicon (Si), ruthenium (Ru), tin (Sn), tungsten (W), uranium (U), seaborgium (Sg), and tellurium (Te).

The multi-metal oxide may have a fluorite crystal structure, a pyrochlore crystal structure, or a mixed crystal structure thereof.

The multi-metal oxide may have a single phase of orthorhombic.

The A-ion radius/B-ion radius ratio of the multi-metal oxide may be about 0.7 to 1.1.

The average pore diameter of the porous multi-metal oxide nanotubes may be about 10 to 20 nm.

In an aspect, provided is a polymer electrolyte membrane that may include an ion conductor inside the pores of a nanoweb including of the porous multi-metal oxide nanotubes.

The content of the porous multi-metal oxide nanotubes may be about 0.5 to 1.5 wt % based on 100 wt % of the total weight of the polymer electrolyte membrane.

Also provided is an electrode may include the porous multi-metal oxide nanotubes as described herein and a binder.

The content of the porous multi-metal oxide nanotubes may be about 0.5 to 1.5 wt % based on 100 wt % of the total sum of the multi-metal oxide nanotubes and the binder.

Further provided is a fuel cell including the polymer electrolyte membrane as described herein.

BRIEF DESCRIPTION OF THE DRAWINGS

The above and other features of the present invention will now be described in detail with reference to certain exemplary examples thereof illustrated in the accompanying drawings which are given herein below by way of illustration only, and thus are not limitative of the present invention, and wherein:

FIGS. 3A and 3B are SEM images of an exemplary polymer electrolyte membrane (Nafion-TZONT membrane) produced using $Ti_2Zr_2O_8$ multi-nanotubes (TZONT) (FIG. 3A: 1,100× magnification, and FIG. 3B: 8,000× magnification);

FIG. 7B: 20% RH);

FIG. 8B: 20% RH);

DETAILED DESCRIPTION

Figure 1:
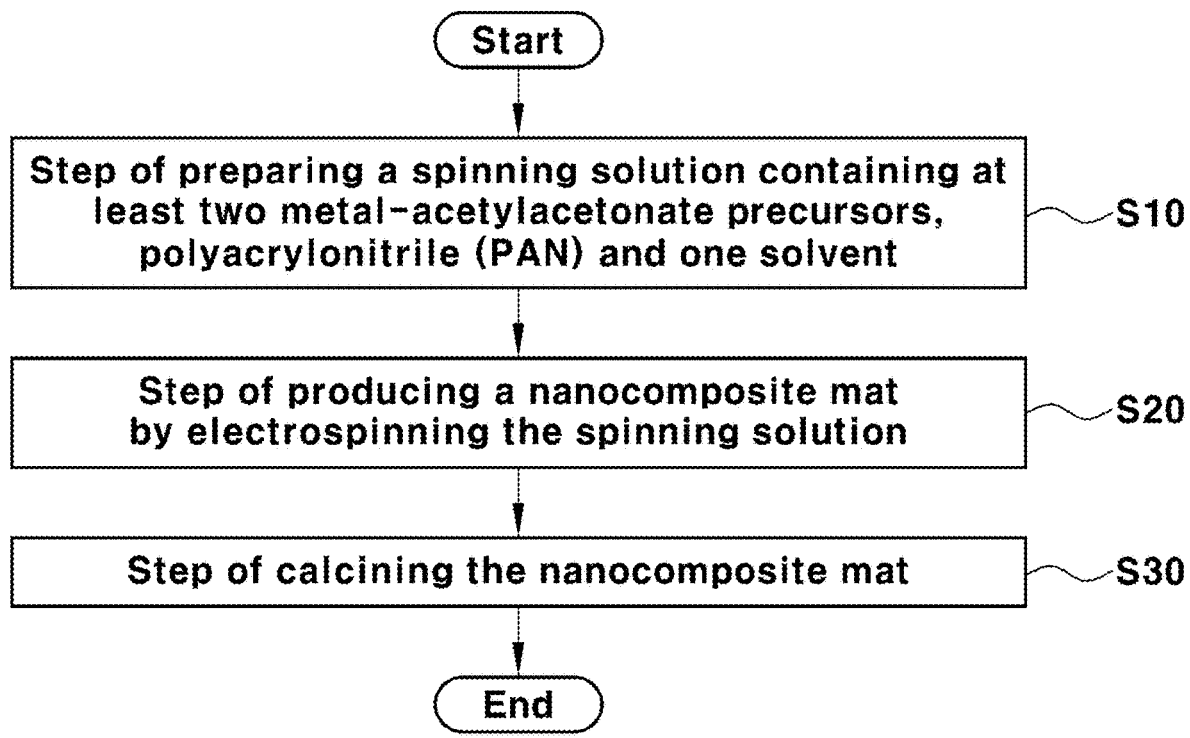
FIG. 1 shows an exemplary method for producing porous multi-metal oxide nanotubes according to an exemplary embodiment of the present invention.

The above objects, other objects, features and advantages of the present invention will become apparent with reference to embodiments described below in conjunction with the accompanying drawings. However, the present invention is not limited to the embodiments disclosed below and may be embodied in a variety of different forms. Rather, these embodiments disclosed herein are provided so that this invention will be thorough and complete, and will fully convey the spirit of the present invention to those skilled in the art.

In the present specification, it should be understood that terms such as "include" and "have" are intended to denote the existence of mentioned characteristics, numbers, steps, operations, components, parts, or combinations thereof, but do not exclude the probability of existence or addition of one or more other characteristics, numbers, steps, operations, components, parts, or combinations thereof. In addition, when a part, such as a layer, film, region, plate, or the like, is referred to as being "on" or "above" another part, it not only refers to a case where the part is directly above the other part, but also a case where a third part exists there between. Conversely, when a part, such as a layer, film, region, plate, or the like, is referred to as being "below" another part, it not only refers to a case where the part is directly below the other part, but also a case where a third part exists there between.

Since all numbers, values and/or expressions referring to quantities of components, reaction conditions, polymer compositions, and mixtures used in the present specification are subject to various uncertainties of measurement encountered in obtaining such values, unless otherwise indicated, all are to be understood as modified in all instances by the term "about." Where a numerical range is disclosed herein, such a range is continuous, inclusive of both the minimum and maximum values of the range as well as every value between such minimum and maximum values, unless otherwise indicated. Still further, where such a range refers to integers, every integer between the minimum and maximum values of such a range is included, unless otherwise indicated. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, where a range is stated for a parameter, it will be understood that the parameter includes all values within the stated range, inclusive of the stated endpoints of the range. For example, a range of 5 to 10 will be understood to include the values 5, 6, 7, 8, 9, and 10, as well as any sub-range such as 6 to 10, 7 to 10, 6 to 9, and 7 to 9, and also include any value and range between the integers which are reasonable in the context of the range stated, such as 5.5, 6.5, 7.5, 5.5 to 8.5 and 6.5 to 9. For example, a range of "10% to 30%" will be understood to include the values 10%, 11%, 12%, 13%, etc., and all integers up to and including 30%, as well as any sub-range such as 10% to 15%, 12% to 18%, 20% to 30%, etc., and also include any value between the integers which are reasonable in the context of the range stated, such as 10.5%, 15.5%, 25.5%, etc.

Provided is a fuel cell technology of improving fuel cell performance by improving proton conductivity even at low humidity. For example, provided herein, inter alia, is a method of producing porous multi-metal oxide nanotubes. When porous multi-metal oxide nanotubes produced using at least two metal-acetylacetonate precursors under specific conditions satisfy a single-phase multivalence, a mixed crystal structure of an orthorhombic single-phase pyrochlore crystal structure and a fluorite crystal structure, a polymer electrolyte membrane including the porous multi-metal oxide nanotubes may have high proton conductivity under low humidity conditions and the mechanical properties thereof may also be maintained.

FIG. 1 is a schematic diagram showing a method for producing porous multi-metal oxide nanotubes according to an exemplary embodiment of the present invention. The method includes steps of: (S10) preparing a spinning solution containing at least two metal-acetylacetonate precursors, polyacrylonitrile (PAN) and a solvent component; (S20) preparing nanocomposite by electrospinning the spinning solution; and (S30) calcining the nanocomposite.

Step (S10) of preparing the spinning solution includes a step of preparing a spinning solution by mixing at least two metal-acetylacetonate precursors, polyacrylonitrile (PAN) and a solvent component.

Metals contained in the at least two metal-acetylacetonate precursors may include a non-radioactive alkali metal stable isotope and a non-radioactive alkaline earth metal stable isotope. Preferably, the non-radioactive alkali metal stable isotope may include one or more selected from the group consisting of titanium (Ti), cerium (Ce), strontium (Sr), lanthanum (La), gadolinium (Gd), erbium (Er), scandium (Sc), palladium (Pd), osmium (Os), dysprosium (Dy), ytterbium (Yb), indium (In), and neodymium (Nd), and the non-radioactive alkaline earth metal stable isotope may include at least one selected from the group consisting of zirconium (Zr), niobium (Nb), yttrium (Y), tantalum (Ta), vanadium (V), molybdenum (Mo), silicon (Si), ruthenium (Ru), tin (Sn), tungsten (W), uranium (U), seaborgium (Sg), and tellurium (Te).

Accordingly, the at least two metal-acetylacetonate precursors may include one or more precursors selected from the group consisting of titanium (Ti) (IV) oxyacetylacetonate, zirconium (Zr) (IV) acetylacetonate, cerium (Ce) (III) acetylacetonate, neodymium (Nd) (IV) acetylacetonate, gadolinium (Gd) (III) acetylacetonate, vanadyl acetylacetonate ($VO(C_5H_7O_2)_2$), tantalum (Ta) (V) acetylacetonate, niobium (Nb) (V) acetylacetonate, strontium (Sr) acetylacetonate, palladium (Pd) (II) acetylacetonate, and yttrium (Y) (III) acetylacetonate precursors.

Preferably, the at least two metal-acetylacetonate precursors may include titanium (Ti) (IV) oxyacetylacetonate and zirconium (Zr) (IV) acetylacetonate so as to provide a more controlled reaction rate in the synthesis of metal oxide nanostructures. For example, the titanium (Ti) (IV) oxyacetylacetonate and zirconium (Zr) (IV) acetylacetonate may have a stronger ligand coordination, and may be less susceptible to hydrolysis, which is a common drawback of other precursors, due to their low moisture susceptibility, and may be easily synthesized into metal oxide nanostructures by heating when a polar solvent containing oxygen is used. More preferably, the molar ratio of titanium (Ti) (IV) oxyacetylacetonate: zirconium (Zr) (IV) acetylacetonate may be about 1:1 to 1.4, even more preferably about 1:1.2. When the molar ratio is excessively low outside the above range, a problem arises in that the viscosity of the spinning solution is excessively low so that electrospinning is not easily achieved, and when the molar ratio is excessively high, a problem arises in that it is impossible to obtain single-phase porous multi-metal oxide nanotubes.

The spinning solution may be prepared by a mixing and stirring a solution containing the at least two metal-acetylacetonate precursors dissolved therein and a solution containing polymer. The content of the metal-acetylacetonate precursors in the spinning solution may be about 10 to 50 parts by weight, particularly about 10 to 30 parts by weight, based on 100 parts by weight of the polymer. When the content of the at least two metal-acetylacetonate precursors is excessively high outside the above range, a problem arises in that the diameter of the nanotubes excessively increase, so that the surface area of the nanotubes decreases, and when the content of the precursors is excessively low, a problem arises in that the yield of the nanotubes decreases.

As the polymer, polyacrylonitrile (PAN) may be used, but the polymer is not limited thereto. The weight average molecular weight of the polymer may be about 120,000 to 180,000.

Step (S20) of producing the nanocomposite is a step of producing a nanocomposite by electrospinning the spinning solution prepared in step S10.

The electrospinning may be performed by any of the conventional methods that may be used in the present invention. For example, the spinning solution may be spun by, for example, electrospray and electrospinning. As a more specific example, the nanocomposite may be produced by an electrospray or electrospinning apparatus including a syringe having about 5 mL and/or about 10 mL NORM-JECT® and 22G metal nozzles.

The distance between a spinneret and a collector in the electrospinning apparatus that is used in the electrospinning may be about 8 to 12 cm, the high-voltage power in the electrospinning may be about 15 to 22 kV, the volume flow rate during the electrospinning may be about 0.8 to 1 mLh$^{-1}$, and the rotational speed of the spinning solution may be about 300 to 1,000 rpm. In addition, the electrospinning may be performed under an ambient air atmosphere. More preferably, the electrospinning may be performed under conditions of about 20 to 25° C. and less than about 30% RH.

Calcining step (S30) includes a step of calcining the nanocomposite produced in step (S20).

The electrospun nanocomposite may be calcined at a temperature of higher than about 400° C. to not higher than about 600° C. for about 1 to 5 hours. Particularly, the nanocomposite may be calcined at a temperature of higher than about 400° C. to not higher than about 500° C.

As such, since the nanotubes are doped with nitrogen while being calcined, the nanotubes have high electron transport ability, and the effect of photoelectric conversion characteristics may be increased.

Where the nanocomposite is calcined in the above temperature range, it is possible to easily adjust the average diameter of the porous metal oxide nanotubes, and particularly, it is possible to obtain porous metal oxide nanotubes having a tubular hollow structure and having an average outer diameter of about 80 to 100 nm and an average inner diameter of about 10 to 20 nm.

The heating rate during calcination in the calcining step may be about 4 to 6° C./min, particularly about 5° C./min. Preferably, before the calcination reaction, the electrospun nanocomposite may be stabilized at a temperature of about 230 to 250 about ° C. for about 0.5 to 1.5 hours, particularly for about 1 hour.

The calcination may be performed under any one atmosphere including air, argon (Ar), nitrogen (N$_2$), and/or oxygen (O$_2$).

After a multi-metal oxide cluster is formed through the calcination process, carbon in the cluster may be decomposed as the temperature further increases, thus producing hollow porous metal oxide nanotubes.

The porous multi-metal oxide nanotubes may be produced by the above-described production method and include a multi-metal oxide represented by the following Formula and having a single-phase multivalence.

$$A_2B_2O_8 \qquad \text{[Formula ]}$$

wherein A is a non-radioactive alkali metal stable isotope ion, and B is a non-radioactive alkaline earth metal stable isotope ion.

Since the porous multi-metal oxide in the porous multi-metal oxide nanotubes includes ion A and ion B which are uniformly distributed therein, the single phase of the multi-metal oxide may be orthorhombic. Since the porous multi-metal oxide has a single-phase multivalence, it is characterized in that a redox reaction occurs more abundantly due to the multivalent transition of each cation, and activation energy for diffusion of oxide ions decreases.

In addition, the multi-metal oxide may have a fluorite crystal structure, a pyrochlore crystal structure, or a mixed crystal structure thereof. Preferably, the crystal structure of the multi-metal oxide may be a mixed crystal structure of a fluorite crystal structure and a pyrochlore crystal structure. The crystal structure thereof may be a mixed crystal structure which is based on a fluorite crystal structure and also includes a crystal structure similar to a pyrochlore crystal structure, and thus the multi-metal oxide is characterized by having excellent oxygen storage and release characteristics as a large number of large voids are ensured in the crystal structure thereof while the phase of the multi-metal oxide is stable.

Accordingly, the polymer electrolyte membrane produced to include a nanoweb including the porous multi-metal oxide nanotubes that satisfy the single-phase multivalence and crystal structure characteristics may have improved mechanical properties or chemical properties such as proton conductivity.

The multi-metal oxide included in the porous multi-metal oxide nanotubes may be an oxide of one or more metals selected from the group consisting of titanium (Ti), cerium (Ce), strontium (Sr), lanthanum (La), gadolinium (Gd), erbium (Er), scandium (Sc), palladium (Pd), osmium (Os), dysprosium (Dy), ytterbium (Yb), indium (In), and neodymium (Nd), the ion being the non-radioactive alkali metal stable isotope ion A in the above Formula, and an ion of at least one selected from the group consisting of zirconium (Zr), niobium (Nb), yttrium (Y), tantalum (Ta), vanadium (V), molybdenum (Mo), silicon (Si), ruthenium (Ru), tin (Sn), tungsten (W), uranium (U), seaborgium (Sg), and tellurium (Te), the ion being the non-radioactive alkaline earth metal stable isotope ion B in the above Formula.

Preferably, the multi-metal oxide may be an oxide having an A-ion radius/B-ion radius ratio of about 0.7 to 1.1. When the radius ratio is excessively low outside the above range, there is a disadvantage in that the structural hardness of the multi-metal oxide decreases or in that the fluorite crystal structure, which is one of the crystal structures, changes to a crystal structure different from those in the present invention. When the radius ratio is excessively high outside the above range, there is a disadvantage in that the structural hardness of the multi-metal oxide increases or in that the fluorite crystal structure is not formed. Particularly, the multi-metal oxide may include Ti$_2$Zr$_2$O$_8$ that is highly resistant to oxidative radical attack, may be well dispersed in the polymer electrolyte membrane, and may function as a catalyst under acidic/basic conditions.

The porous multi-metal oxide nanotubes may be obtained to have a hollow structure, and have an average outer diameter of about 80 to 100 nm and an average inner diameter of about 10 to 20 nm. In particular, the average pore diameter of the porous multi-metal oxide nanotubes may be about 10 to 20 nm. When the average pore diameter is excessively small outside the above range, there are disadvantages in that the ion selectivity of the porous multi-metal oxide nanotubes decreases, a path for transporting reactants is uneven, and the diffusion length to reach active sites extends, resulting in an increase in transport resistance. When the average pore diameter is excessively large, there are disadvantages in that the bulk density and ion selectivity of the nanotubes decrease, the crossover thereof is high, and the surface area thereof decreases, leading to a decrease in active/anchoring sites.

Further provided is a filler for an electrolyte membrane, and the filler may include porous multi-metal oxide nanotubes. As the filler may include porous multi-metal oxide nanotubes, preferably porous TNTs, which include a multi-metal oxide, preferably $Ti_2Zr_2O_8$, it may maintain a high moisture content at a temperature higher than about 100° C. and/or low humidity. For example, the filler may maintain a high moisture content even under the conditions of temperature of about 100 to 110° C. and humidity of about 18% RH or less.

Further provided is a polymer electrolyte membrane for a fuel cell. The polymer electrolyte membrane may include: a nanoweb including porous multi-metal oxide nanotubes as a filler; and an ion conductor included in the pores of the nanoweb. Also provided is an electrode including: porous multi-metal oxide nanotubes as a filler; and a binder.

At this time, the content of the porous multi-metal oxide nanotubes in the polymer electrolyte membrane may be about 0.5 to 1.5 wt % based on 100 wt % of the total weight of the polymer electrolyte membrane, and the content of the porous multi-metal oxide nanotubes in the electrode may be about 0.5 to 1.5 wt % based on 100 wt % of the sum total of the multi-metal oxide nanotubes and the binder. When the content of the nanotubes is excessively low outside the above range, there is a disadvantage in that active sites in a catalyst layer decrease, leading to a decrease in the performance of the fuel cell. When the content of the nanotubes is excessively high outside the above range, there is a disadvantage in that the nanotubes are likely to aggregate, and thus mass transfer in the catalyst layer may not be smooth.

Particularly, the porous multi-metal oxide nanotubes may increase the proton-reducing ability of the polymer electrolyte membrane or the electrode, and thus provide a fuel cell having excellent current density while having excellent proton conductivity even at high temperature and low humidity.

EXAMPLE

Hereinafter, the present invention will be described in more detail with reference to a Production Example and Examples. The following Examples are merely to help understand the present invention, and the scope of the present invention is not limited thereto.

PRODUCTION EXAMPLE

Production of $Ti_2Zr_2O_8$ Multi-Nanotubes (TZONT) as Porous Multi-Metal Oxide Nanotubes (S10) At a temperature of 90° C., titanium (IV) oxyacetylacetonate (TiOacac) and zirconium (IV) acetylacetonate (Zracac), which are at least two metal acetylacetonate precursors, were dissolved at a molar ratio of 1:1.2 in 3.00 g of N,N-dimethylformamide (DMF) as a solvent. In addition, at a temperature of 90° C., 1.00 g of polyacrylonitrile (PAN, Mw=150,000 g/mol) was completely dissolved in 6.00 g of DMF. The TiOacac-Zracac solution and the PAN solution were mixed together and stirred at a temperature of 90° C. until a clear homogeneous solution was observed.

(S20) The resulting solution was electrospun to produce a nonwoven mat. Specifically, the moving distance between the spinneret and the collector was 10 cm, the high-voltage power in the electrospinning was 15 kV, the volume flow rate during the electrospinning was 1.0 mLh$^{-1}$, and the rotational speed of the roller in which the mat was collected was 300 rpm. In addition, during the electrospinning, the humidity was less than 30% RH, and the temperature was 20 to 25° C. Accordingly, a PAN/TiOacac-Zracac composite nonwoven mat was produced.

(S30) The electrospun PAN/TiOacac-Zracac composite nonwoven mat was stabilized at 250° C. for 1 hour to remove organic matter, and then calcined at a temperature of 600° C. for 3 hours, thus producing $Ti_2Zr_2O_8$ multi-nanotubes (TZONT). The heating rate during the calcination was 5° C. per minute.

The yield of the $Ti_2Zr_2O_8$ multi-nanotube (TZONT) product obtained after calcination was 28 wt %.

Figure 2A:
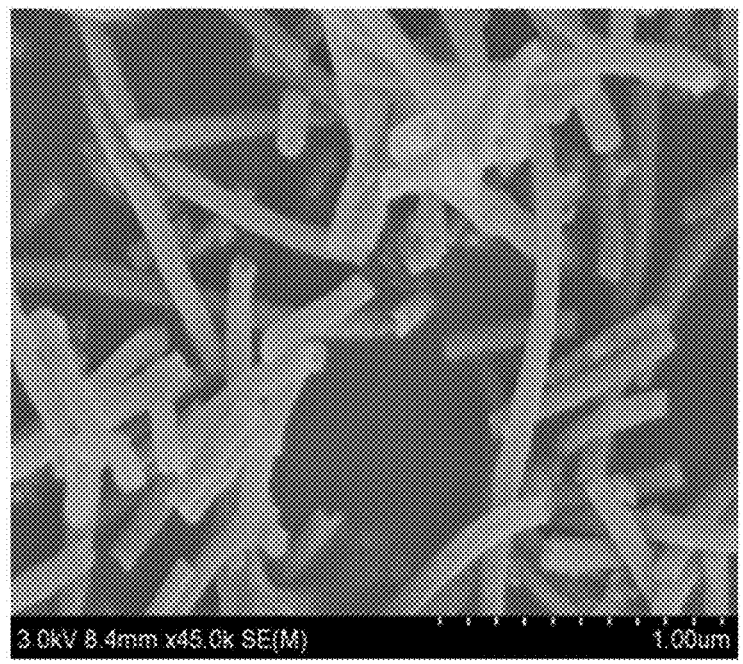
FIGS. 2A and 3B are SEM images of exemplary $Ti_2Zr_2O_8$ multi-nanotubes (TZONT) (FIG. 2A: 45,000× magnification, and FIG. 2B: 80,000× magnification)
Figure 2B:
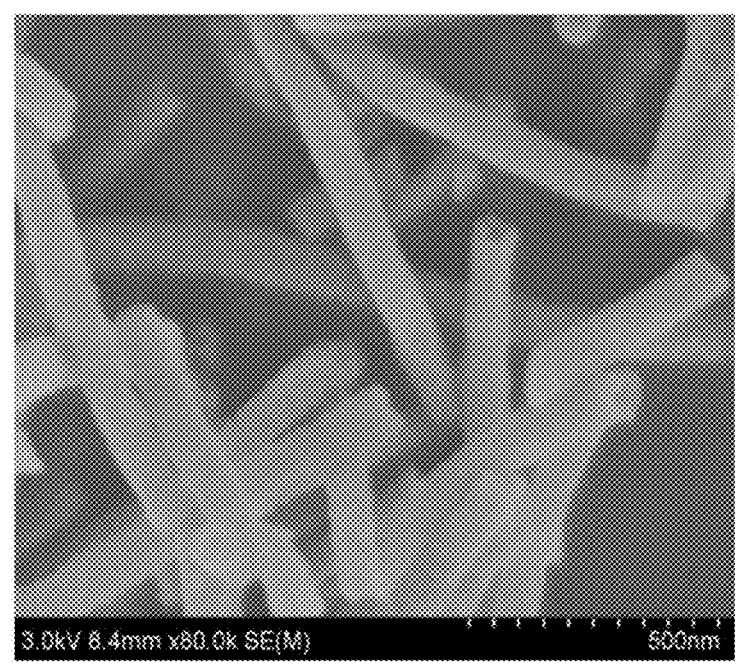

FIGS. 2A and 2B are SEM images of the $Ti_2Zr_2O_8$ multi-nanotubes (TZONT), and it can be confirmed that the $Ti_2Zr_2O_8$ multi-nanotubes (TZONT) produced according to the Production Example were in the form of tubes having various lengths.

Example 1

Production of Polymer Electrolyte Membrane for Fuel Cell Using $Ti_2Zr_2O_8$ Multi-Nanotubes (TZONT)

The $Ti_2Zr_2O_8$ multi-nanotubes (TZONT) produced in the Production Example and 0.5 to 1.5 wt % of Nafion ionomer were stirred using an ultrasonic cleaner and an agitator until a homogeneous mixture was obtained. The mixture was poured into a Petri dish and then dried in a vacuum oven at a temperature of each of 50, 60, 70 and 80° C. for 2 hours. The produced electrolyte membranes were separated from the Petri dish and dried at a temperature of 100° C. for 4 hours, thus producing a proton transport channel and a polymer electrolyte membrane (Nafion-TZONT membrane) including the same. The average thickness of the produced polymer electrolyte membrane was about 50±5 μm, and the polymer electrolyte membrane, produced using the $Ti_2Zr_2O_8$ multi-nanotubes (TZONT) produced in the Production Example, was treated sequentially with 5% hydrogen peroxide, water, 0.5 M sulfuric acid and water for 1 hour per treatment while being heated.

Figure 3A:
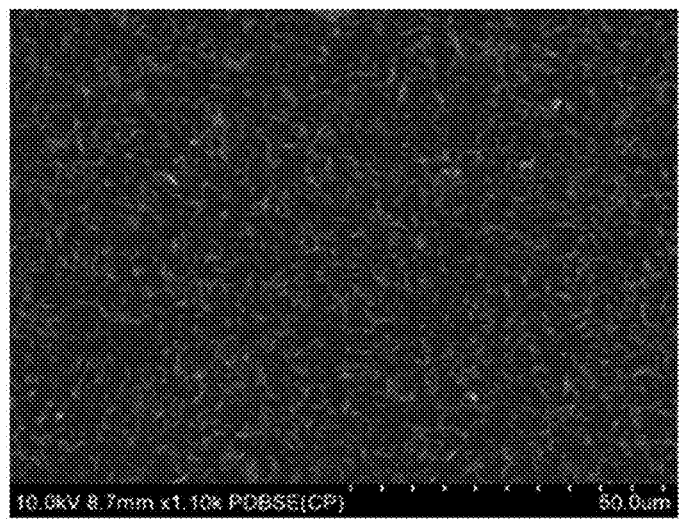
Figure 3B:
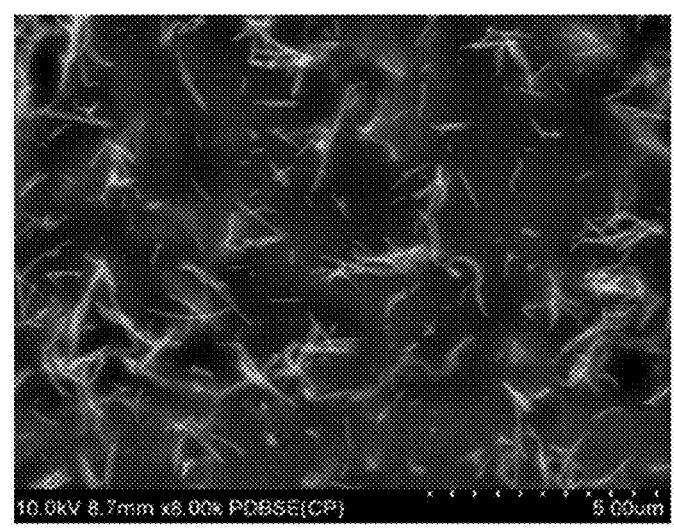

After production, the content of the $Ti_2Zr_2O_8$ multi-nanotubes (TZONT) was 1 wt % based on the total weight of the polymer electrolyte membrane. FIGS. 3A and 3B are SEM images of the polymer electrolyte membrane (Nafion-TZONT membrane) produced using the $Ti_2Zr_2O_8$ multi-nanotubes (TZONT) and it can be confirmed that the $Ti_2Zr_2O_8$ multi-nanotubes (TZONT) were uniformly dispersed in the Nafion-TZONT membrane.

Example 2

Production of Fuel Cell Electrode (Positive Electrode) Using $Ti_2Zr_2O_8$ Multi-Nanotubes (TZONT)

Based on the solid content of a binder in a binder solution (5 wt % Nafion perflourinated resin solution), 0.5, 1.0 and 1.5 wt % of the $Ti_2Zr_2O_8$ multi-nanotubes (TZONT) were introduced into and mixed with the binder solution, followed by ultrasonic treatment for 1 hour. Thereafter, the mixture was stirred at room temperature for 8 hours, thus producing an electrode mixture solution. Next, the electrode mixture solution was mixed with Pt/C using deionized (DI) water and isopropyl alcohol (IPA) as a solvent, thus producing an electrode slurry. A gas diffusion layer was coated with the electrode slurry, thus producing an electrode.

After production, the content of the $Ti_2Zr_2O_8$ multi-nanotubes (TZONT) was 1 wt % based on 100 wt % of the sum total of the metal oxide nanotubes and the binder.

Example 3

Production of Fuel Cell Including Polymer Electrolyte Membrane for Fuel Cell

As a polymer electrolyte membrane, the polymer electrolyte membrane (Nafion-TZONT membrane) produced in Example 1 was used. Both the positive electrode and the negative electrode were fabricated using Pt/C and a binder. For faster mass transfer and ORR reaction, a binder (Nafion) was added only to the positive electrode side in an amount of 10 to 30 wt % (on a solid basis) based on the weight of Pt/C. For fast HOR reaction, a binder (Nafion) was added to the negative electrode in an amount of 10 to 30 wt % (on a solid basis) based on the weight of Pt/C.

Example 4

Production of Fuel Cell Including Polymer Electrolyte Membrane and Electrodes for Fuel Cell As a polymer electrolyte membrane, the polymer electrolyte membrane (Nafion-TZONT membrane) produced in Example 1 was used, and as a positive electrode, the electrode produced in Example 2 was used, and as a negative electrode, the negative electrode used in Example 3 was used.

Comparative Examples 1 to 5

Production of Polymer Electrolyte Membranes for Fuel Cells Using Single Nanotubes or Nanoparticles Polymer electrolyte membranes for fuel cells were produced in the same manner as in Example 1, except for the following differences: a polymer electrolyte membrane (Comparative Example 1) produced using only Nafion instead of the $Ti_2Zr_2O_8$ multi-nanotubes (TZONT) produced in Production Example 1; a polymer electrolyte membrane (Nafion-TONT membrane; Comparative Example 2) produced using porous titanium dioxide ($TiO_2$) nanotubes instead of the $Ti_2Zr_2O_8$ multi-nanotubes (TZONT); a polymer electrolyte membrane (Nafion-ZONT membrane; Comparative Example 3) produced using porous zirconium dioxide ($ZrO_2$) nanotubes instead of the $Ti_2Zr_2O_8$ multi-nanotubes (TZONT); a polymer electrolyte membrane (Nafion-CeNT membrane; Comparative Example 4) produced using porous cerium dioxide ($CeO_2$) nanotubes instead of the $Ti_2Zr_2O_8$ multi-nanotubes (TZONT); and a polymer electrolyte membrane (Nafion-CeNP membrane; Comparative Example 5) produced using porous cerium dioxide ($CeO_2$) nanoparticles instead of the $Ti_2Zr_2O_8$ multi-nanotubes (TZONT).

Comparative Examples 6 to 11

Production of Fuel Cells

Fuel cells were produced in the same manner as in Example 3, except for the following differences: a fuel cell (Comparative Example 6) produced using the polymer electrolyte membrane for a fuel cell, produced in Comparative Example 1; a fuel cell (Comparative Example 7) produced using the polymer electrolyte membrane for a fuel cell, produced in Comparative Example 2; a fuel cell (Comparative Example 8) produced using the polymer electrolyte membrane for a fuel cell, produced in Comparative Example 3; a fuel cell (Comparative Example 9) produced using the polymer electrolyte membrane for a fuel cell, produced in Comparative Example 4; and a fuel cell (Comparative Example 10) produced using the polymer electrolyte membrane for a fuel cell, produced in Comparative Example 5.

In addition, a fuel cell (Comparative Example 11) was produced in the same manner as in Example 4, except that the polymer electrolyte membrane for a fuel cell, produced in Comparative Example 1, was used.

Experimental Example 1

Figure 4A:
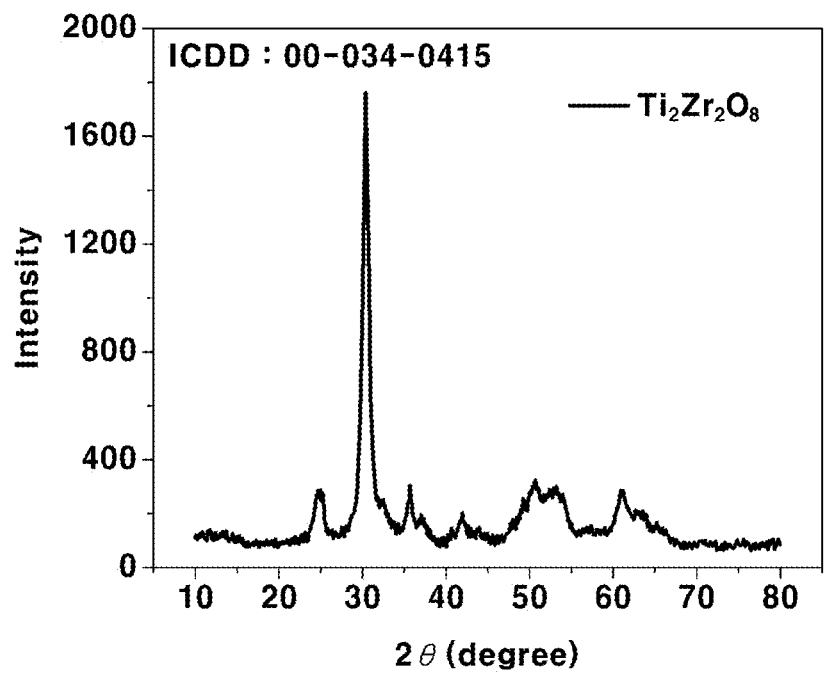
FIG. 4A is an XRD pattern graph obtained by performing X-ray diffraction analysis to analyze the crystal phase of the $Ti_2Zr_2O_8$ multi-nanotubes (TZONT) produced in Production Example 1.
Figure 4B:
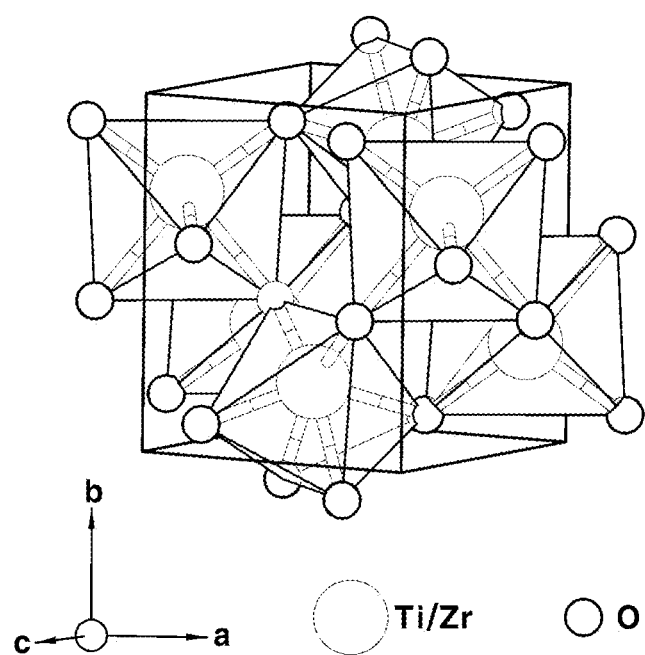
FIG. 4B shows the lattice structure of $Ti_2Zr_2O_8$ multi-nanotubes (TZONT)

Evaluation of Crystal Phase of $Ti_2Zr_2O_8$ Multi-Nanotubes (TZONT) as Porous Multi-Metal Oxide Nanotubes FIG. 4A is an XRD pattern graph obtained by performing X-ray diffraction analysis to analyze the crystal phase of the $Ti_2Zr_2O_8$ multi-nanotubes (TZONT) produced in Production Example 1. Also, FIG. 4B shows the lattice structure of the $Ti_2Zr_2O_8$ multi-nanotubes (TZONT).

As shown in FIG. 4A, it can be confirmed that the XRD pattern according to the standard XRD database (ICDD: 00-034-0415) was consistent with $Ti_2Zr_2O_8$. As shown in FIG. 4B, it can be confirmed that the lattice structure of the multi-metal oxide $Ti_2Zr_2O_8$ (TZO) shown with reference to the XRD pattern graph of FIG. 4A had two formula units in a cell with a space group of Pbcn(60), lattice parameters of a=466(3) Å, b=5.60 (3) Å and c=5.02(2) Å, and a d statistic of 0.23026, and that the density of TZO was 5.1546 g cm$^{-3}$.

That is, it can be confirmed that the titanium and zirconium elements were homogeneously dispersed, suggesting that the multi-metal oxide $Ti_2Zr_2O_8$ (TZO) included in the $Ti_2Zr_2O_8$ multi-nanotubes (TZONT) was a single crystal (orthorhombic) phase.

In addition, it can be confirmed that the FCC (large) cations and anions were located at all the eight tetrahedral positions, suggesting that the crystal structure of the multi-metal oxide $Ti_2Zr_2O_8$ (TZO) was a fluorite crystal structure with a formula of $A_2B_2O_8$. In addition, as a result of analyzing the bonding distance between the cation and the oxide ion and the position of the cation and analyzing the density according to packing of the atoms, it can be confirmed that the crystal structure of the multi-metal oxide $Ti_2Zr_2O_8$ (TZO) was also similar to a pyrochlore crystal structure, suggesting that the crystal structure of the multi-metal oxide $Ti_2Zr_2O_8$ (TZO) was a mixed crystal structure of the fluorite crystal structure and the pyrochlore crystal structure.

Therefore, the multi-metal oxide $Ti_2Zr_2O_8$ (TZO) produced had excellent ionic conductivity, excellent thermal stability and excellent dielectric polarization properties, and also had excellent oxygen storage and release characteristics as a number of large voids were ensured in the crystal structure thereof while the phase of the multi-metal oxide was stable. Thus, a polymer electrolyte membrane produced to include a nanoweb including the porous multi-metal oxide nanotubes that satisfied the single phase and crystal structure characteristics had improved mechanical properties or chemical properties such as proton conductivity.

Experimental Example 2

Evaluation of Proton Conductivity of Polymer Electrolyte Membrane for Fuel Cell Since a polymer electrolyte membrane having a higher proton conductivity value can provide better PEMFC performance, proton conductivity may be an important property having a direct effect on the performance of the electrolyte membrane.

Figure 5:
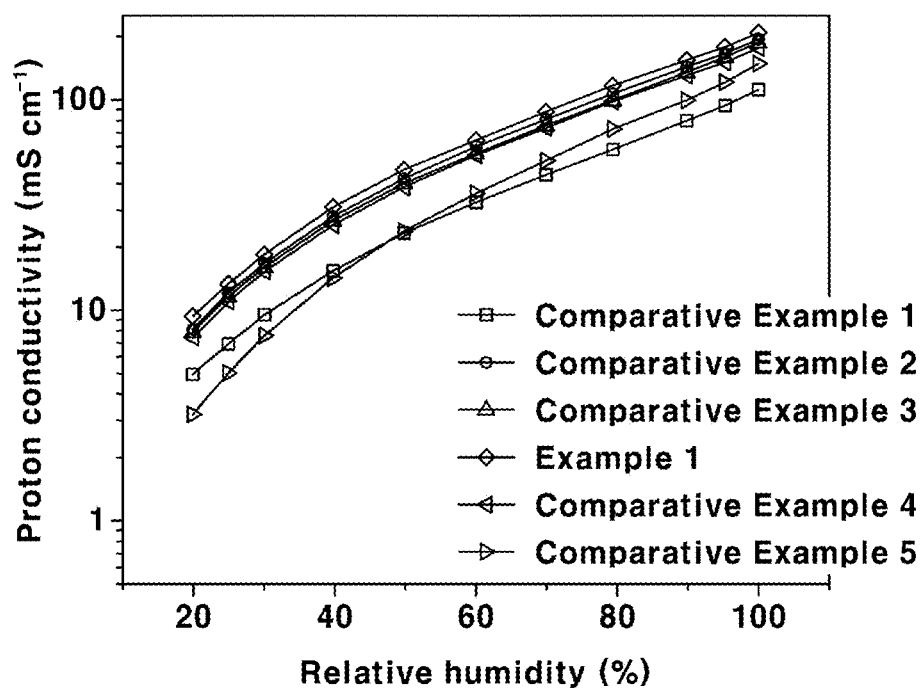
FIG. 5 is a graph showing the results of evaluating the proton conductivities of exemplary polymer electrolyte membranes according to Example 1 and Comparative Examples 1 to 5.

Accordingly, the proton conductivities of the polymer electrolyte membranes produced according to Example 1 and Comparative Examples 1 to 5 were evaluated, and the results of the evaluation are graphically shown in FIG. 5.

As shown in FIG. 5, it can be confirmed that the proton conductivity value of each of the polymer electrolyte membranes increased as the relative humidity increased. Particularly, the proton conductivity values of the polymer electrolyte membranes according to Comparative Example 1, Comparative Example 2, Comparative Example 3, Example 1, Comparative Example 4 and Comparative Example 5 under the conditions of temperature of 80° C. and humidity of 20% RH were 5.0, 8.1, 7.9, 9.4, 4.4 and 3.2 mScm$^{-1}$, respectively, and the proton conductivity values thereof under 100% RH humidity conditions were 111.4, 192.9, 189.6, 207.9, 176.0 and 148.9 mS cm$^{-1}$, respectively.

That is, it can be confirmed that the proton conductivity of the polymer electrolyte membrane according to Example 1 was 1.9 times higher at 20% RH and 1.9 times higher at 100% RH than the proton conductivity of the polymer electrolyte membrane according to Comparative Example 1, mainly because of the integrated $Ti_2Zr_2O_8$ multi-nanotubes (TZONT) which efficiently promote the diffusion of water itself through the polymer electrolyte membrane.

That is, the polymer electrolyte membrane produced to include a nanoweb including the porous multi-metal oxide nanotubes produced according to an exemplary embodiment of the present invention had improved chemical properties such as proton conductivity under both humid conditions and dry conditions.

Experimental Example 3

Tensile Testing Evaluation of Polymer Electrolyte Membrane for Fuel Cell

The mechanical properties of a polymer electrolyte membrane may be important parameters when evaluating the strength of a composite membrane, and in general, the mechanical strength of the composite membrane can be evaluated using tensile testing. Accordingly, the polymer electrolyte membranes produced according to Example 1 and Comparative Examples 1 to 5 were evaluated using tensile testing, and the results of the evaluation are graphically shown in FIG. 6.

Figure 6:
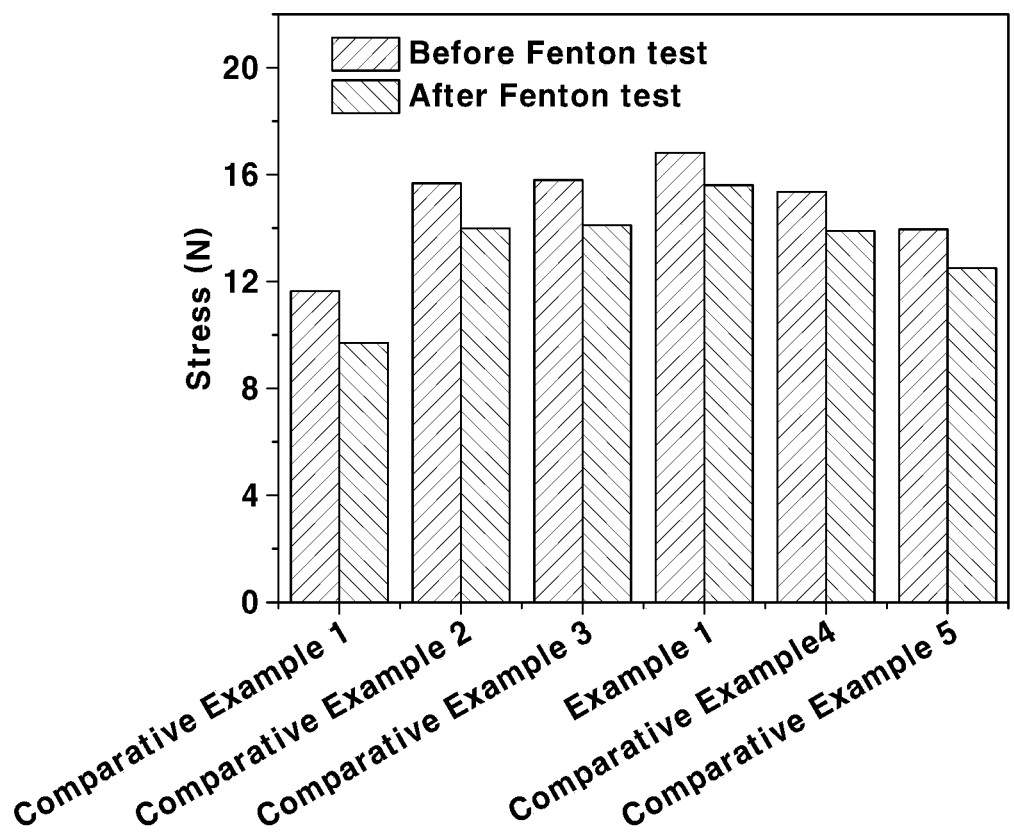
FIG. 6 is a graph showing the results of performing tensile testing evaluation of exemplary polymer electrolyte membranes according to Example 1 and Comparative Examples 1 to 5.

As shown in FIG. 6, the breaking stress of the polymer electrolyte membrane according to Example 1 was 16.8 N, which was higher than those of Comparative Example 1 (11.7 N), Comparative Example 2 (15.7 N), Comparative Example 3 (15.8 N), Comparative Example 4 (15.4 N) and Comparative Example 5 (14.0 N).

In addition, as a result of performing tensile testing evaluation after performing the Fenton test (2 ppm $FeSO_4$ in 3% $H_2O_2$) for 120 hours at a temperature of 80° C., it can be confirmed that the breaking stresses of Comparative Example 1, Comparative Example 2, Comparative Example 3, Example 1, Comparative Example 4 and Comparative Example 5 were 9.6, 14.0, 14.2, 15.6, 13.9 and 12.5 N, respectively.

That is, it can be confirmed that the mechanical losses of the polymer electrolyte membranes of Comparative Example 1, Comparative Example 2, Comparative Example 3, Example 1, Comparative Example 4, and Comparative Example 5 after the Fenton test were 16.6, 10.7, 10.4, 7.2, 9.5, and 10.4%, respectively. Thus, it can be confirmed that the polymer electrolyte membrane produced to include the nanoweb including the porous multi-metal oxide nanotubes produced according to an exemplary embodiment of the present invention had high tensile strength, suggesting that the polymer electrolyte membrane also has excellent mechanical properties.

In addition, the oxidative stability and fluoride emission rate (FER) of each of the polymer electrolyte membranes according to Example 1 and Comparative Examples 1 to 5 were measured after the Fenton test (for 120 hours at a temperature of 80° C.), and the results of the measurement are shown in Table 1 below.

TABLE 1

| Membrane | Oxidative stability (%) | FER (ppm h$^{-1}$ g$^{-1}$) |
|---|---|---|
| Comparative Example 1 | 91.4 | 0.118 |
| Comparative Example 2 | 95.7 | 0.022 |
| Comparative Example 3 | 95.4 | 0.026 |
| Example 1 | 96.3 | 0.021 |
| Comparative Example 4 | 96.4 | 0.022 |
| Comparative Example 5 | 94.2 | 0.025 |

As shown in Table 1 above, it can be confirmed that the polymer electrolyte membranes of Comparative Example 1, Comparative Example 2, Comparative Example 3, Example 1, Comparative Example 4 and Comparative Example 5 showed oxidative stabilities of 91.4, 95.7, 95.4, 96.3, 96.4 and 96.2%, respectively, and in particular, the polymer electrolyte membrane of Example 1 maintained an oxidative stability of 95% even after the Fenton test. As such, the $Ti_2Zr_2O_8$ multi-nanotubes (TZONT) included in the polymer electrolyte membrane produced according to Example 1 may suppress the membrane from being decomposed due to hydroxyl radical attack. Meanwhile, it can be confirmed that, after the oxidative stability test, the polymer electrolyte membranes of Comparative Example 1, Comparative Example 2, Comparative Example 3, Example 1, Comparative Example 4, and Comparative Example 5 showed FER values of 0.118, 0.022, 0.026, 0.021, 0.022, and 0.025 h$^{-1}$g$^{-1}$, respectively, and in particular, the polymer electrolyte membrane according to Example 1 had a lower FER value than the polymer electrolyte membrane according to Comparative Example 4.

That is, it can be confirmed that the interaction between the sulfonic acid group of the Nafion ionomer and the $Ti_2Zr_2O_8$ multi-nanotubes (TZONT), which is a mechanically and chemically stable bond which is a hydrogen bond, acted as a radical scavenging effect, suggesting that the polymer electrolyte membrane according to Example 1 had a low FER value while having high tensile modulus and high oxidative stability.

Experimental Example 4

Cell Performance Test for Fuel Cell

For the fuel cells according to Examples 3 to 4 and Comparative Examples 6 to 11, the fuel cell performance was evaluated under a temperature condition of 80° C. and different humidity conditions (100% RH and 20% RH). Particularly, the $H_2$ and $O_2$ flow rates were 300 sccm, and a heater was used to prevent condensation of water vapor by maintaining a gas supply line at a temperature of 80° C. or higher, and the cooling water temperatures were adjusted to 80° C. and 45° C., respectively, in order to achieve relative humidity of RH 100% and RH 20%, respectively, using the temperature of the humidifier. The fuel cell performance was evaluated under the above conditions, and the results of the evaluation are shown in Tables 2 and 3 below. In addition, cell voltages and power densities versus current densities are graphically shown in FIGS. 7A through 8B.

TABLE 2

| | | Anode electrode | | Cathode electrode Pt/C Nafion | | FC performance | | | |
|---|---|---|---|---|---|---|---|---|---|
| | | Pt/C | Nafion | (catalyst | (binder) | 100% relative humidity | | 20% relative humidity | |
| | | (catalyst and loading amount) [mg cm$^{-2}$] | (binder) [wt % relative to catalyst weight] | and loading amount) [mg cm$^{-2}$] | relative to catalyst weight] | Peak power density [mW cm$^{-2}$] | Peak current density [mA cm$^{-2}$] | Peak power density [mW cm$^{-2}$] | Peak current density [mA cm$^{-2}$] |
| | Electrolyte | | | | | | | | |
| Comparative Example 6 (Nafion-212) | Nafion | 0.5 | 8 | 0.5 | 30 | 735 | 2151 | 269 | 1146 |
| Comparative Example 7 (Modified Memb.) | Nafion-TONT-1 | 0.5 | 8 | 0.5 | 30 | 770 | 2621 | 377 | 1436 |
| Comparative Example 8 (Modified Memb.) | Nafion-ZONT-1 | 0.5 | 8 | 0.5 | 30 | 742 | 2196 | 489 | 1900 |
| Example 3 (Modified Memb.) | Nafion-TZONT-1 | 0.5 | 8 | 0.5 | 30 | 924 | 2666 | 569 | 2118 |
| Comparative Example 9 (Modified Memb.) | Nafion-CeNT-1 | 0.5 | 8 | 0.5 | 30 | 747 | 2302 | 438 | 1710 |
| Comparative Example 10 (Modified Memb.) | Nafion-CeNP-1 | 0.5 | 8 | 0.5 | 30 | 707 | 2504 | 430 | 1693 |

TABLE 3

| | | Anode electrode | | | Cathode electrode | | | FC performance | | | |
|---|---|---|---|---|---|---|---|---|---|---|---|
| | | Pt/C (catalyst and loading amount) [mg/cm$^2$] | Nafion (binder) [wt % relative to catalyst weight] | Content of $Ti_2Zr_2O_8$ in catalyst layer [wt % based on total sum of binder material + metal oxide] | Pt/C (catalyst and loading amount) [mg/cm$^2$] | Nafion (binder) [wt % relative to catalyst weight] | Content of $Ti_2Zr_2O_8$ in catalyst layer [wt % based on total sum of binder material + metal oxide] | 100% relative humidity | | 20% relative humidity | |
| | Electrolyte | | | | | | | Peak power density [mW/cm$^2$] | Peak current density [mA/cm$^2$] | Peak power density [mW/cm$^2$] | Peak current density [mA/cm$^2$] |
| Comparative Example 6 (Nafion-212) | Nafion | 0.5 | 8 | 0 | 0.5 | 30 | 0 | 735 | 2151 | 269 | 1146 |
| Example 3 (Modified Memb.) | Nafion-TZONT-1 | 0.5 | 8 | 0 | 0.5 | 30 | 0 | 924 | 2666 | 569 | 2118 |

TABLE 3-continued

| | | Anode electrode | | | Cathode electrode | | | FC performance | | | |
| --- | --- | --- | --- | --- | --- | --- | --- | --- | --- | --- | --- |
| | | | | Content of $Ti_2Zr_2O_8$ in catalyst layer [wt % based on | | | Content of $Ti_2Zr_2O_8$ in catalyst layer [wt % based on | | | | |
| | | | Nafion | | | Nafion | | 100% relative humidity | | 20% relative humidity | |
| | Electrolyte | Pt/C (catalyst and loading amount) [mg/cm$^2$] | (binder) [wt % relative to catalyst weight] | total sum of binder material + metal oxide] | Pt/C (catalyst and loading amount) [mg/cm$^2$] | (binder) [wt % relative to catalyst weight] | total sum of binder material + metal oxide] | Peak power density [mW/cm$^2$] | Peak current density [mA/cm$^2$] | Peak power density [mW/cm$^2$] | Peak current density [mA/cm$^2$] |
| Comparative Example 11 (Nafion-212/ Modified/ CL) | Nafion-212 | 0.5 | 8 | 0 | 0.5 | 30 | 1.0 | 850 | 2811 | 512 | 2084 |
| Example 4 (Modified Memb./ Modified CL) | Nafion-TZONT-1 | 0.5 | 8 | 0 | 0.5 | 30 | 1.0 | 1050 | 3526 | 673 | 2230 |

Figure 7A:
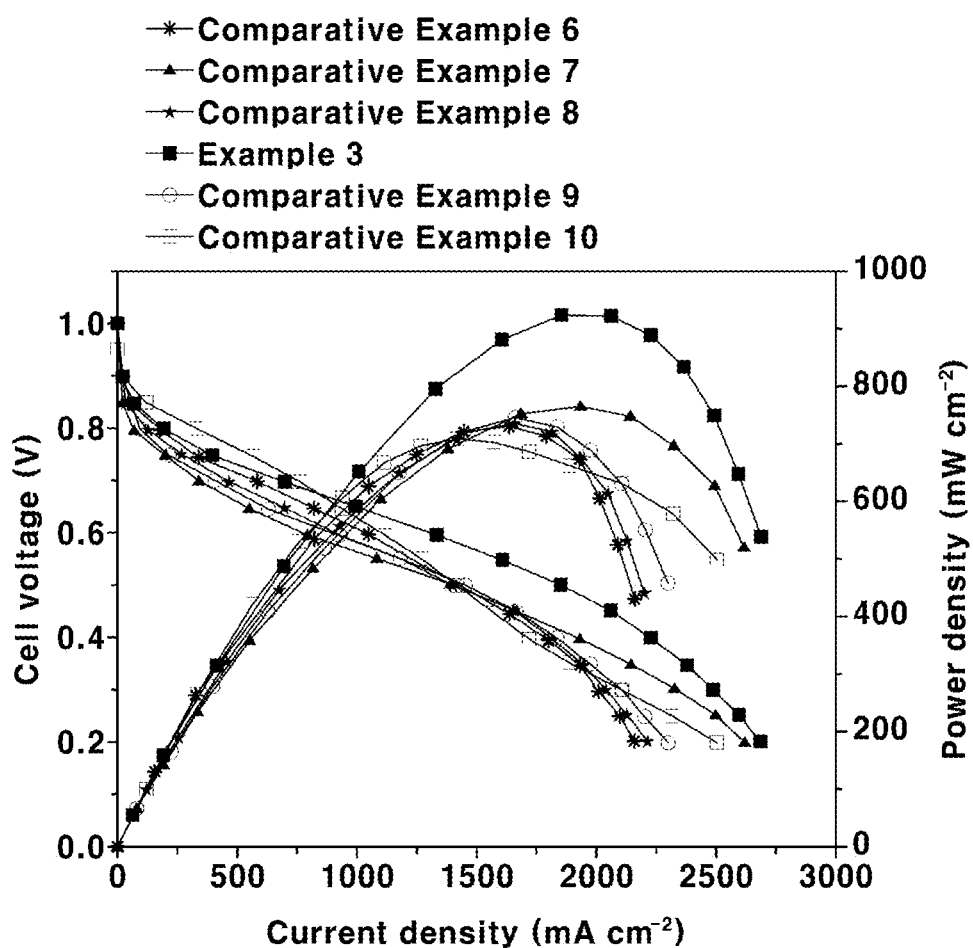
FIGS. 7A and 7B are graphs showing cell voltages and power densities versus current densities of fuel cells according to Example 3, in which $Ti_2Zr_2O_8$ multi-nanotubes (TZONT) were applied only to a polymer electrolyte membrane, and Comparative Examples 6 to 10 (FIG. 7A: 100% RH.
Figure 7B:
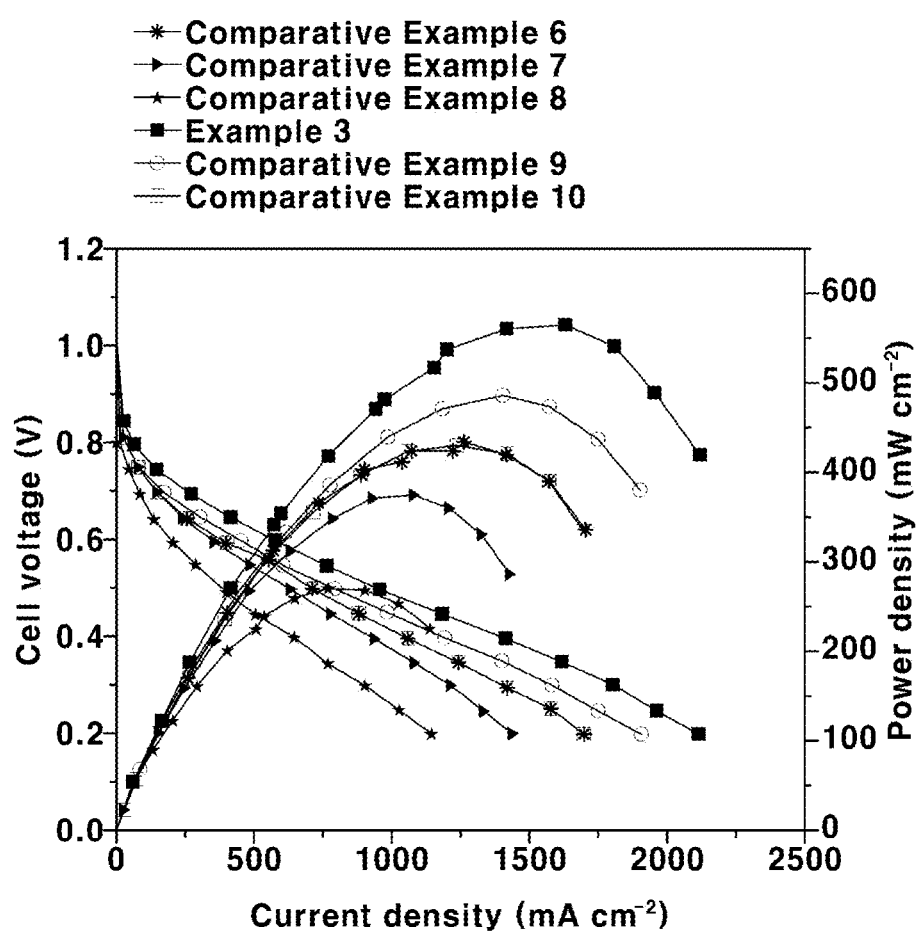

Particularly, FIGS. 7A and 7B are graphs showing cell voltages and power densities versus current densities of the fuel cells according to Example 3, in which the $Ti_2Zr_2O_8$ multi-nanotubes (TZONT) were applied only to the polymer electrolyte membrane, and Comparative Examples 6 to 10.

As shown in Table 2 above and FIGS. 7A and 7B, it can be confirmed that the peak power densities of the fuel cells according to Comparative Example 6, Comparative Example 7, Comparative Example 8, Example 3, Comparative Example 9, and Comparative Example 10 were 735, 770, 742, 924, 747 and 707 mW cm$^{-2}$, respectively. As such, the fuel cell of Example 3, in which the $Ti_2Zr_2O_8$ multi-nanotubes (TZONT) were introduced to the polymer electrolyte membrane, showed better performance characteristics than the fuel cells of the Comparative Examples including the fuel cell (Nafion-CeNP-1) of Comparative Example 10.

Meanwhile, in the graphs of FIGS. 7A and 7B, the proton conductivity tends to decrease as the slope increases. In particular, referring to FIG. 7B, it can be confirmed that, under a poor humidity condition of 20% RH, the fuel cell according to Example 3 could withstand the harsh environment while showing a relatively low power loss of about 41% on average, compared to the fuel cell according to Comparative Example 6 that showed a power loss of about 63%. The fuel cell produced according to an exemplary embodiment of the present invention had a high peak current density even under a low humidity condition, and thus has excellent fuel cell performance.

Figure 8A:
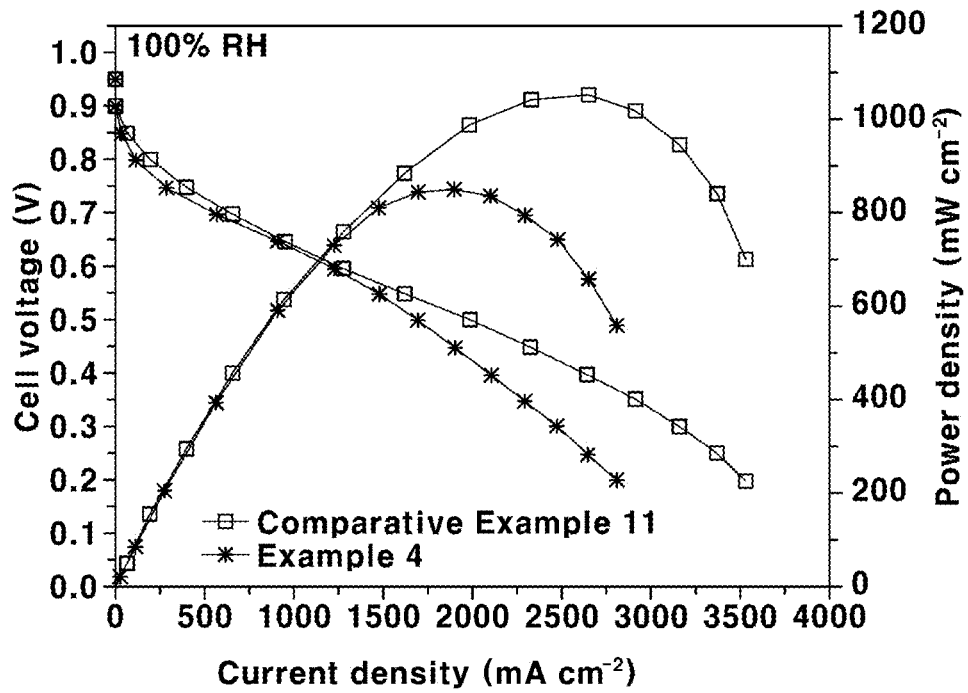
FIGS. 8A and 8B are graphs showing cell voltages and power densities versus current densities of fuel cells according to Example 4 in which $Ti_2Zr_2O_8$ multi-nanotubes (TZONT) were applied to a positive electrode, and Comparative Example 11 (FIG. 8A: 100% RH.
Figure 8B:
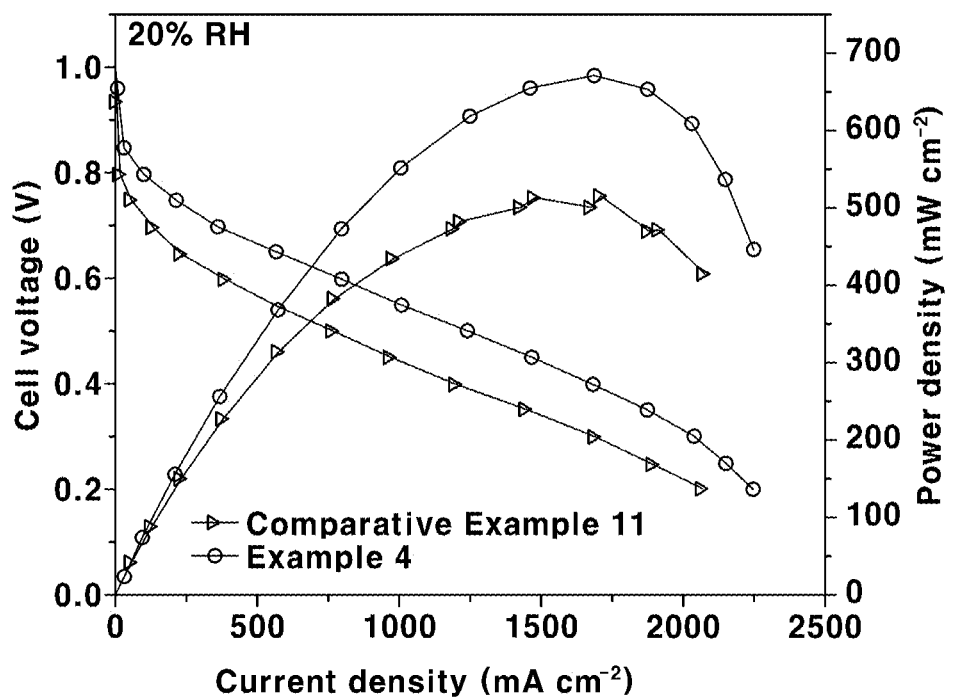

In addition, FIGS. 8A and 8B are graphs showing cell voltages and power densities versus current densities of the fuel cells according to Example 4, in which the $Ti_2Zr_2O_8$ multi-nanotubes (TZONT) were applied to the positive electrode, and Comparative Example 11.

As shown in Table 3 above and FIG. 8A, it can be confirmed that, under a humidity condition of 100% RH, the peak current densities of the fuel cells according to Example 4 and Comparative Example 11 were 1,050 and 850 mW cm$^{-2}$, respectively. As such, even when the positive electrode obtained using the $Ti_2Zr_2O_8$ multi-nanotubes (TZONT) is additionally applied, the fuel cell according to Example 4, which included the polymer electrolyte membrane obtained using the $Ti_2Zr_2O_8$ multi-nanotubes (TZONT), showed a peak current density which is 1.2 times greater than that of Comparative Example 11, which did not include the polymer electrolyte membrane obtained using the $Ti_2Zr_2O_8$ multi-nanotubes (TZONT). Meanwhile, it can be confirmed that the peak current density of the fuel cell according to Example 4 was 1.1 times greater than that of the fuel cell of Example 3 to which the positive electrode obtained using the $Ti_2Zr_2O_8$ multi-nanotubes (TZONT) was not applied.

In addition, as shown in Table 3 above and FIG. 8B, it can be confirmed that, under a humidity condition of 20% RH, the peak current densities of the fuel cells according to Example 4 and Comparative Example 11 were 673 and 512 mW cm$^{-2}$, respectively. Even when the positive electrode obtained using the $Ti_2Zr_2O_8$ multi-nanotubes (TZONT) was additionally applied, the fuel cell according to Example 4, which included the polymer electrolyte membrane obtained using the $Ti_2Zr_2O_8$ multi-nanotubes (TZONT), showed a peak current density which was 1.3 times greater than that of the fuel cell according to Comparative Example 11, which did not include the polymer electrolyte membrane obtained using the $Ti_2Zr_2O_8$ multi-nanotubes (TZONT). Meanwhile, it can be confirmed that the peak current density of the fuel cell according to Example 4 was 1.2 times higher than that of the fuel cell of Example 3 to which the positive electrode obtained using the $Ti_2Zr_2O_8$ multi-nanotubes (TZONT) was not applied.

That is, it can be confirmed that the fuel cell produced according to an exemplary embodiment of the present invention had improved moisture retention capacity through an additional proton channel even under low humidity conditions, and thus exhibits a radical scavenging effect for membrane stability even under poor conditions, suggesting that the fuel cell may have improved performance.

Experimental Example 5

Measurement of Fluoride Emission Rate (FER) Value by Open-Circuit Voltage (OCV) Retention Test for Fuel Cell For the fuel cells according to Example 3 and Comparative Example 6, an open-circuit voltage (OCV) retention test was performed under a temperature condition of 80° C. and a humidity condition of 20% RH. The liquid discharged from each of the negative electrode and the positive electrode was collected every 24 hours, and the fluoride emission rate (FER) value thereof was measured as the concentration of fluorine ions. The results of the measurement are shown in FIGS. 9A and 9B and FIG. 10.

Figure 9A:
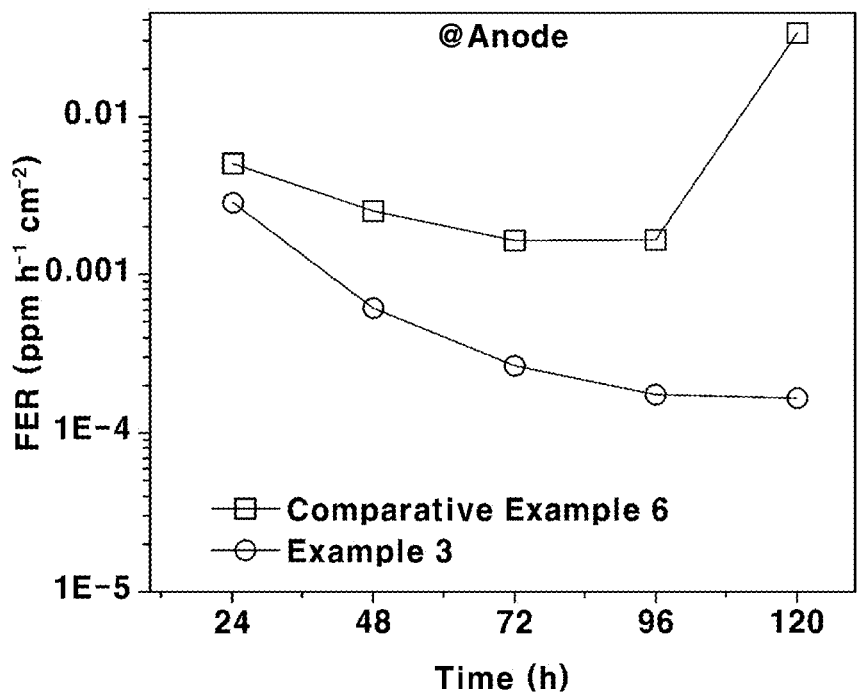
FIGS. 9A and 9B are graphs showing the fluoride emission rate (FER) value of the negative electrode (anode) side (FIG. 9A) and the fluoride emission rate (FER) value of the positive electrode (cathode) side (FIG. 9B), of a polymer electrolyte membrane, according to an open-circuit voltage (OCV) retention test for fuel cells according to Example 3 and Comparative Example 6.
Figure 9B:
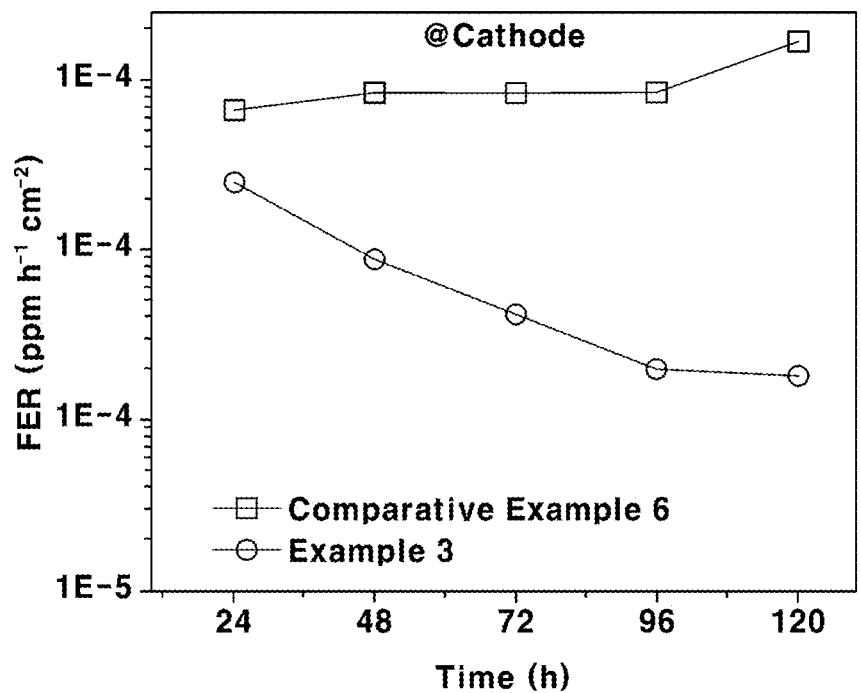
Figure 10:
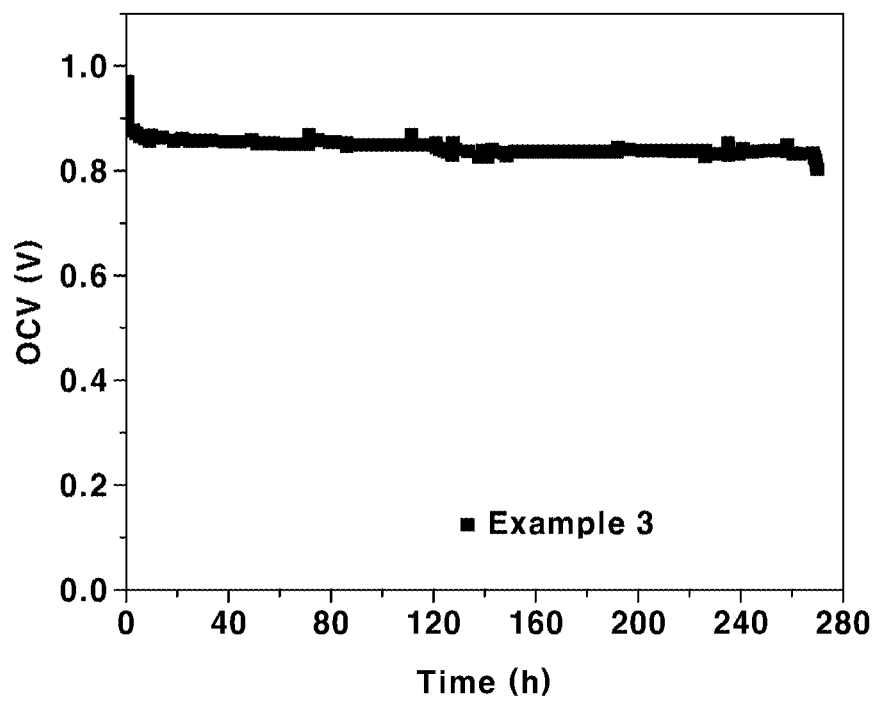
FIG. 10 is a graph showing the time-dependent results of the open-circuit voltage (OCV) retention test for a fuel cell of Example 3 under a temperature condition of 80° C. and a humidity condition of 20% RH.

Specifically, FIGS. 9A and 9B are graphs showing the fluoride emission rate (FER) value of the negative electrode (anode) side (FIG. 9A) and the fluoride emission (FER) rate of the positive electrode (cathode) side (FIG. 9B), of the polymer electrolyte membrane, according to the open-circuit voltage (OCV) retention test.

As such, it can be confirmed that the FER value ($F^-$ ion concentration) of the fuel cell according to Comparative Example 6 was relatively constant from 24 hours to 96 hours, but increased rapidly after 120 hours. On the other hand, the FER value of the fuel cell according to Example 3 continuously decreased.

As a result, it can be confirmed that, after 120 hours, the $F^-$ ion concentrations of the anode and cathode sides of the polymer electrolyte membrane in the fuel cell according to Example 3 were $1.6 \times 10^{-4}$ and $1.8 \times 10^{-4}$ ppm $h^{-1} cm^{-2}$, respectively, whereas the $F^-$ ion concentrations of the anode and cathode sides of the polymer electrolyte membrane in the fuel cell according to Comparative Example 6 were $3.3 \times 10^{-2}$ and $1.7 \ 10 \times 10^{-2}$ ppm $h^{-1} cm^{-2}$, respectively. As such, after 120 hours, the FER values of the anode and cathode sides of the polymer electrolyte membrane in the fuel cell according to Example 3 were 208 times and 93 times, respectively, which were lower than those of the polymer electrolyte membrane in the fuel cell according to Comparative Example 6.

A hydroxyl radical may be generated from a hydroperoxide formed by a chemical reaction of $O_2$ and $H_2$ or an electrochemical oxygen reduction reaction caused by a two-electron process during cell operation. From the above results, it can be specifically confirmed that the polymer electrolyte membrane in the fuel cell according to Comparative Example 6 was attacked by hydroxyl radicals, so that pinholes or cracks were formed at the cathode site, thereby increasing the concentration of emitted fluorine ions, and thus $O_2$ gas may penetrate the anode side to chemically form $H_2O_2$, suggesting that deterioration in the polymer electrolyte membrane can proceed toward the anode side.

Taken together, it can be confirmed that the polymer electrolyte membrane in the fuel cell according to Example 3 had a low FER value by preventing the attack of hydroxyl radicals, suggesting that the polymer electrolyte membrane has excellent durability.

Meanwhile, FIG. 10 is a graph showing the time-dependent results of the open-circuit voltage (OCV) retention test for the fuel cell of Example 3 under a temperature condition of 80° C. and a humidity condition of 20% RH.

As such, it can be confirmed that the OCV value of the polymer electrolyte membrane in the fuel cell according to Example 3 was maintained at 0.8 V or more until 270 hours, and the OCV reduction rate thereof was about 0.37 $mVh^{-1}$. Thus, it can be confirmed that, when the $Ti_2Zr_2O_8$ multi-nanotubes (TZONT) are introduced to the polymer electrolyte membrane, the polymer electrolyte membrane may have improved durability even in a poor environment with low humidity conditions, and at the same time, a fuel cell including the same may have improved performance.

That is, according to various exemplary embodiments of the present invention, it is possible to obtain porous multi-metal oxide nanotubes having a single-phase multivalence in high yield without using harmful chemical substances. In particular, the porous multi-metal oxide having a single-phase multivalence is characterized not only by having excellent ionic conductivity, excellent thermal stability and excellent dielectric polarization properties, but also by having excellent oxygen storage and release characteristics as a number of large voids are ensured in the crystal structure of the porous multi-metal oxide while the phase of the multi-metal oxide is stable. Thus, the polymer electrolyte membrane produced to include a nanoweb including the nanotubes including the porous multi-metal oxide that satisfies the above characteristics may have maintained and improved mechanical strength, and thus may have maintained durability even during cell operation and may also have improved proton conductivity even at low humidity. Consequently, a fuel cell including the polymer electrolyte membrane may have improved performance.

As described above, according to various exemplary embodiments of the present invention, it is possible to obtain porous multi-metal oxide nanotubes having a single-phase multivalence in high yield without using harmful chemical substances. In addition, the polymer electrolyte membrane including the porous multi-metal oxide nanotubes produced according to various exemplary embodiments of the present invention may have maintained and improved mechanical strength, and thus may have maintained durability even during cell operation and may also have improved proton conductivity even at low humidity. Consequently, a fuel cell including the polymer electrolyte membrane may have improved performance.

The effects of the present invention are not limited to the above-mentioned effects. It is to be understood that the effects of the present invention include all effects that may be deduced from the above description.

What is claimed is:

1. A method of producing porous multi-metal oxide nanotubes, comprising steps of:
    preparing an admixture comprising metal-acetyl acetonate precursors, polyacrylonitrile (PAN) and a solvent component;
    producing a nanocomposite from the admixture,
    wherein metals of the metal-acetylacetonate precursors comprise a first non-radioactive stable isotope and a second non-radioactive stable isotope,
    wherein the first non-radioactive stable isotope comprises one or more selected from the group consisting of titanium (Ti), cerium (Ce), strontium (Sr), lanthanum (La), gadolinium (Gd), erbium (Er), scandium (Sc), palladium (Pd), osmium (Os), dysprosium (Dy), ytterbium (Yb), indium (In), and neodymium (Nd), and
    wherein the second non-radioactive stable isotope comprises one or more selected from the group consisting of zirconium (Zr), niobium (Nb), yttrium (Y), tantalum (Ta), vanadium (V), molybdenum (Mo), silicon (Si), ruthenium (Ru), tin (Sn), tungsten (W), uranium (U), seaborgium (Sg), and tellurium (Te).

2. The method of claim 1 wherein producing the nanocomposite comprises electrospinning the admixture.

3. The method of claim 1 further comprising calcining the nanocomposite.

4. The method of claim 1, wherein the metal-acetylacetonate precursors comprises two or more precursors selected from the group consisting of titanium (Ti) (IV) oxyacetylacetonate, zirconium (Zr) (IV) acetylacetonate, cerium (Ce) (III) acetylacetonate, neodymium (Nd) (IV) acetylacetonate, gadolinium (Gd) (III) acetylacetonate, vanadyl acetylacetonate ($VO(C_5H7O_2)_2$), tantalum (Ta) (V) acetylacetonate, niobium (Nb) (V) acetylacetonate, strontium (Sr) acetylacetonate, palladium (Pd) (II) acetylacetonate, and yttrium (Y) (III) acetylacetonate precursors.

5. The method of claim 1, wherein a content of the metal-acetylacetonate precursors is 10 to 50 parts by weight based on 100 parts by weight of the polyacrylonitrile (PAN).

6. The method of claim 1, wherein the electrospinning is performed by an electrospinning apparatus, a distance between a spinneret and a collector in the electrospinning apparatus is 8 to 12 cm, a high-voltage power in the electrospinning is 15 to 22 kV, a volume flow rate during the electrospinning is 0.8 to 1 $mLh^{-1}$, a rotational speed of the spinning solution is 300 to 1,000 rpm, and the electrospinning is performed under an ambient air atmosphere.

7. The method of claim 1, wherein the calcining step is performed by calcining the nanocomposite at a temperature of higher than 400° C. to not higher than 600° C. for 1 to 5 hours and/or a heating rate during calcination in the calcining step is 4 to 6° C./min.

8. The method of claim 1, wherein the calcining step comprises stabilizing the nanocomposite at a temperature of 230° C. to 250° C. for 0.5 to 1.5 hours, before calcining the nanocomposite.

* * * * *